United States Patent
Rumble

(10) Patent No.: US 7,219,235 B2
(45) Date of Patent: May 15, 2007

(54) LOCKED PORTAL UNLOCKING CONTROL APPARATUS AND METHOD

(75) Inventor: Robert P. Rumble, Castor Valley, CA (US)

(73) Assignee: Bridgepoint Systems, Inc., Oakland, CA (US)

(*) Notice: Subject to any disclaimer, the term of this patent is extended or adjusted under 35 U.S.C. 154(b) by 696 days.

(21) Appl. No.: 09/813,765

(22) Filed: Mar. 22, 2001

(65) Prior Publication Data

US 2002/0138740 A1 Sep. 26, 2002

(51) Int. Cl.
*H04L 9/00* (2006.01)
(52) U.S. Cl. .................. 713/185; 713/184; 713/182
(58) Field of Classification Search ........ 713/182–185, 713/400–601; 380/44–47, 277–286
See application file for complete search history.

(56) References Cited

U.S. PATENT DOCUMENTS

| | | |
|---|---|---|
| 4,720,860 A | 1/1988 | Weiss |
| 4,802,353 A | 2/1989 | Corder et al. |
| 4,854,143 A | 8/1989 | Corder et al. |
| 5,168,520 A | 12/1992 | Weiss |
| 5,204,663 A | 4/1993 | Lee |
| 5,237,614 A | 8/1993 | Weiss |
| 5,361,062 A | 11/1994 | Weiss et al. |
| 5,479,512 A | 12/1995 | Weiss |
| 5,485,519 A | 1/1996 | Weiss |
| 5,657,388 A | 8/1997 | Weiss |
| 5,936,221 A | 8/1999 | Corder et al. |

OTHER PUBLICATIONS

A high-speed processing LSI for RSA cryptograms using an improved adder circuit Niimura, M.; Fuwa, Y.; TENCON 2004. 2004 IEEE Region 10 Conference vol. B, Nov. 21-24, 2004 pp. 175-178 vol. 2.*

P-adic attack of knapsack cryptosystem Abramov, A.; Modern Communication Technologies, 2001. SIBCOM-2001. The IEEE-Siberian Workshop of Students and Young Researchers Nov. 28-29, 2001 pp. 3-13.*

(Continued)

*Primary Examiner*—David Jung
(74) *Attorney, Agent, or Firm*—Cooley Godward Kronish LLP

(57) ABSTRACT

A locked portal unlocking control system (21) including an encryption device (22) responsive to input of a structure identifier to encrypt a time representation with an encrypting cryptographic key (37) for the structure to produce a cryptogram. At least one structure (32, 32a, 32b, ... 32n) is remote of the encryption device (22) having a lock mechanism (26) controlling opening of a portal to the structure. Each structure (32, 32a, 32b, ... 32n) further includes a decryption device (27, 27a, 27b, .... 27n) having an unlocking assembly (54) coupled to the lock mechanism (26) with the decryption device (27–27n) being responsive to input of the cryptogram (24) to unlock the lock mechanism (26) if a decrypted time representation produced by decrypting the cryptogram meets a time-based criteria in the decryption device (27–27n). A method is also disclosed including the steps of creating a cryptogram, transporting (82) the cryptogram (24) to a remote structure (32–32n), inputting the cryptogram (24) into a decryption device (27) at the structure, decrypting the cryptogram to produce a decrypted time representation (83), comparing (84) the decrypted time representation with a time-based criteria (61) and unlocking the lock (54) if the decrypted time representation (83) meets the time-based criteria (61).

39 Claims, 5 Drawing Sheets

OTHER PUBLICATIONS

A novel unified architecture for public-key cryptography Cilardo, A.; Mazzeo, A.; Mazzocca, N.; Romano, L.; Design, Automation and Test in Europe, 2005. Proceedings 2005 pp. 52-57 vol. 3.*

Security Dynamics, "SecurID Authentication Tokens" Product Datasheet.

* cited by examiner

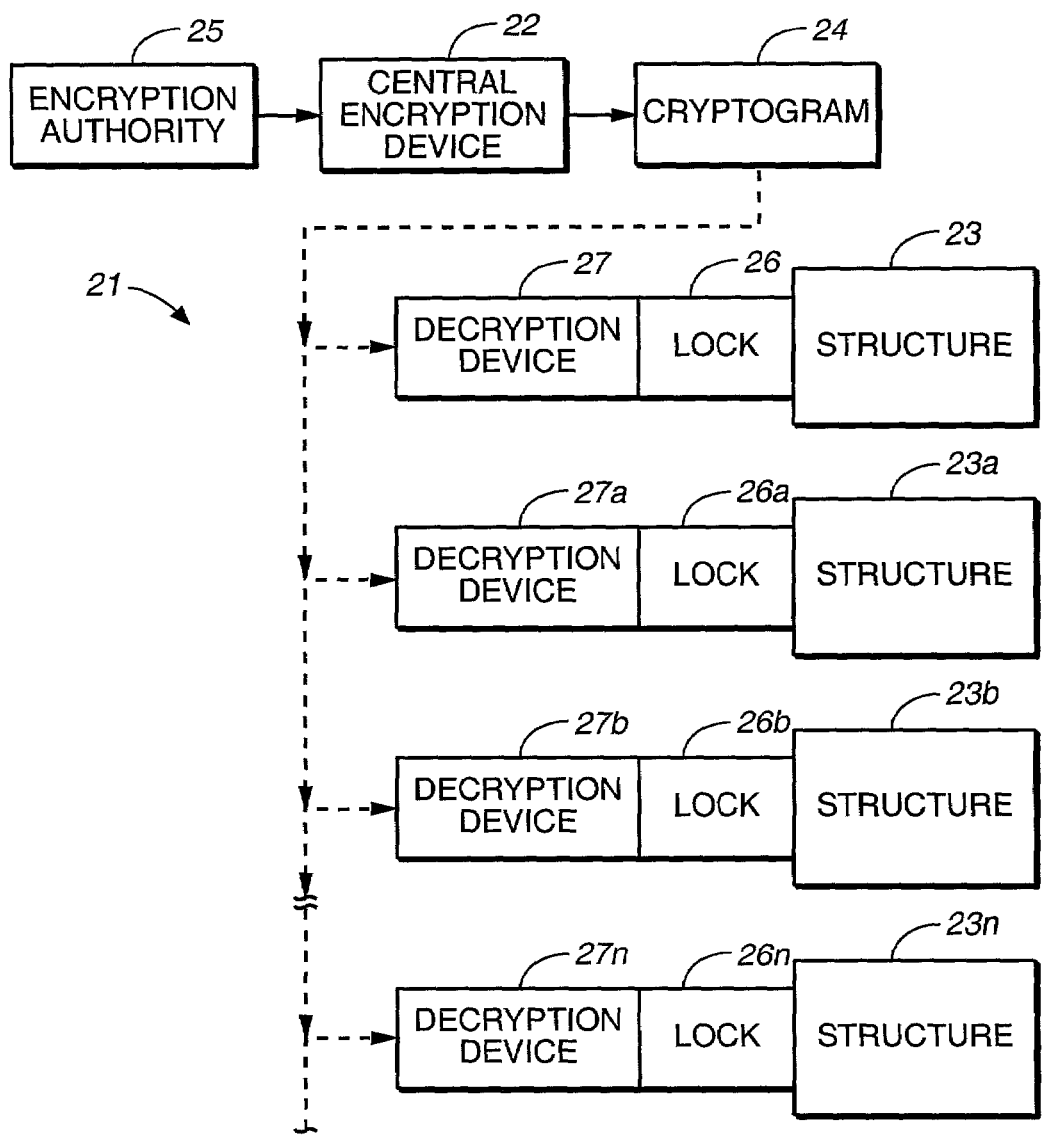
FIG._1

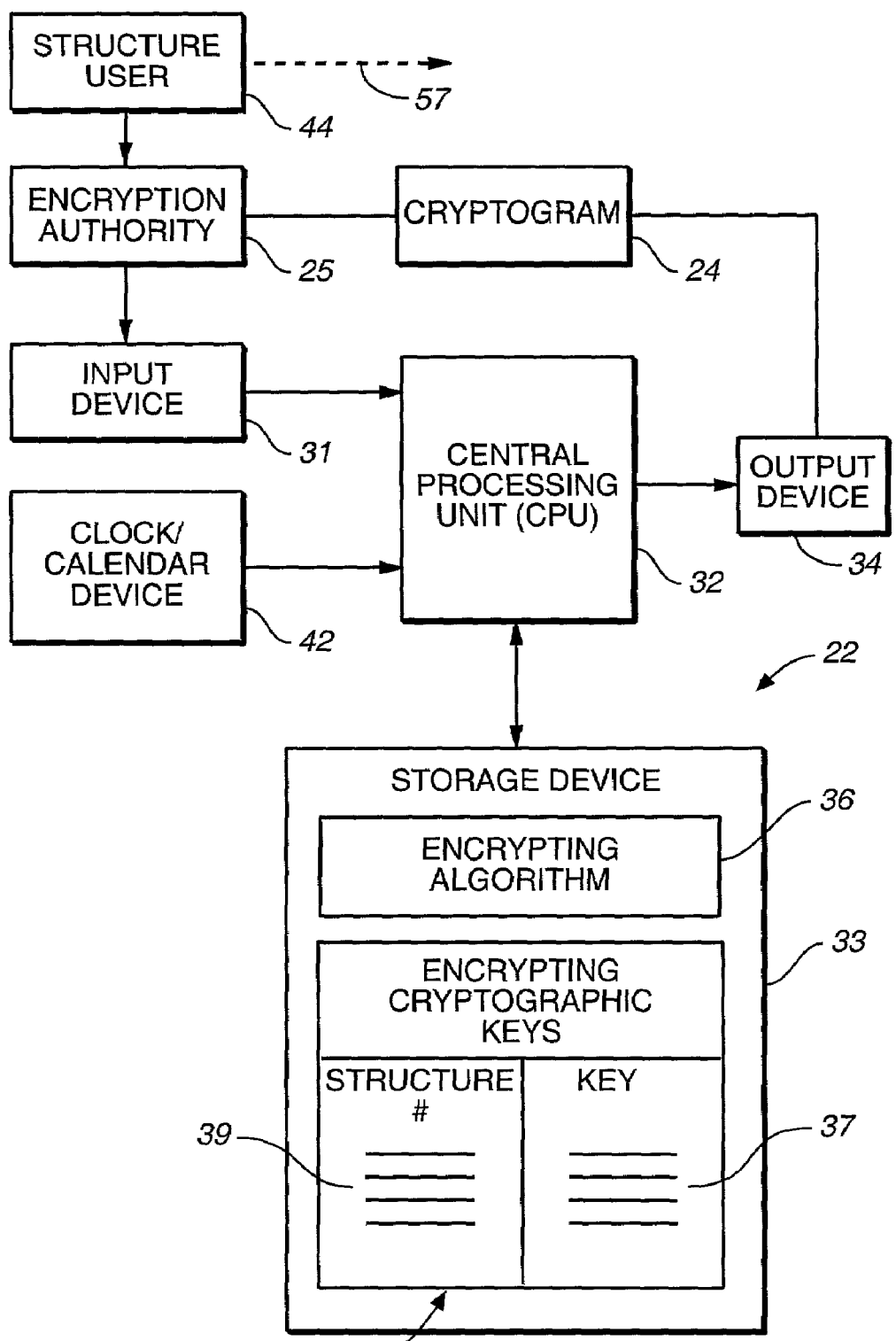
FIG._2

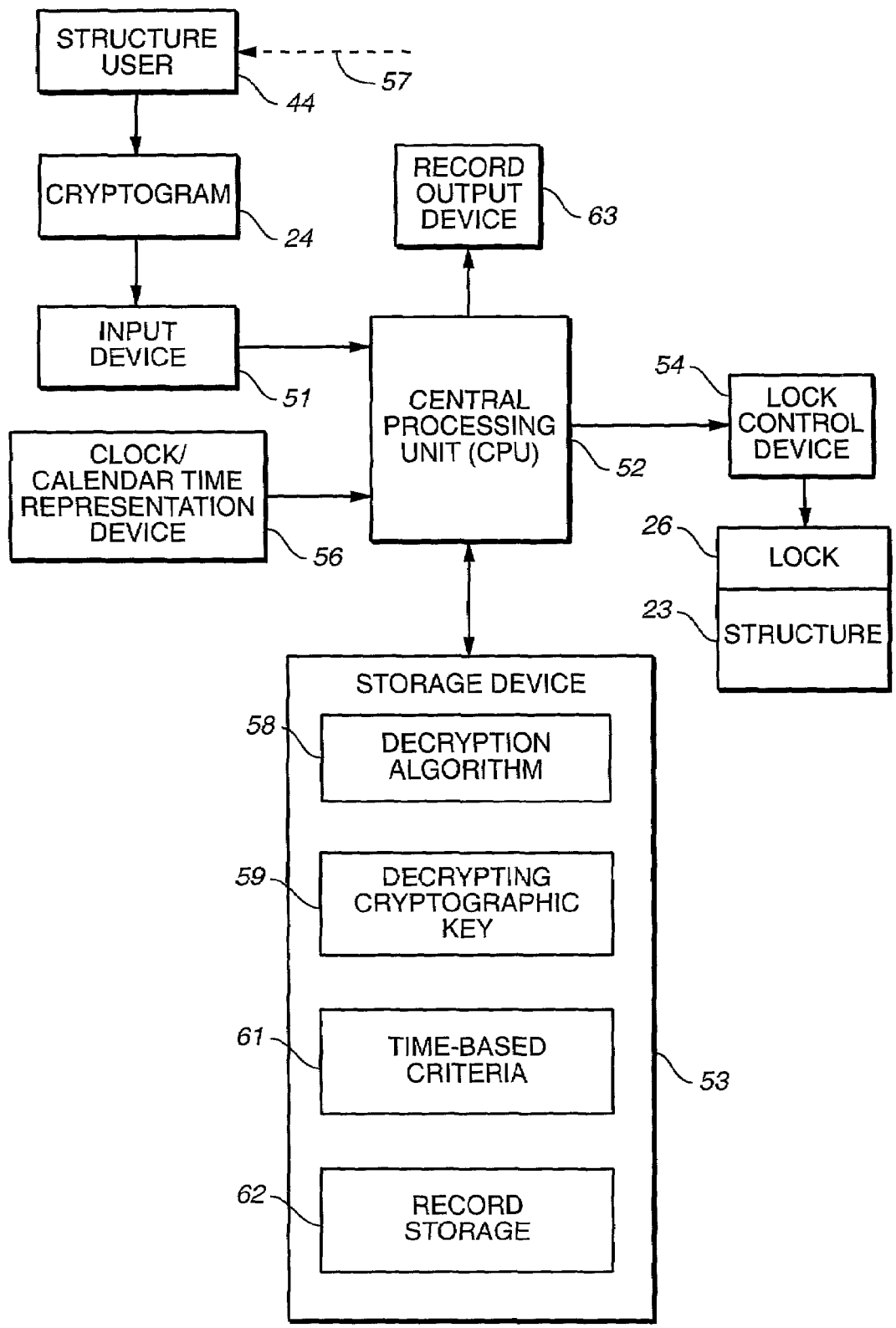
*FIG._3*

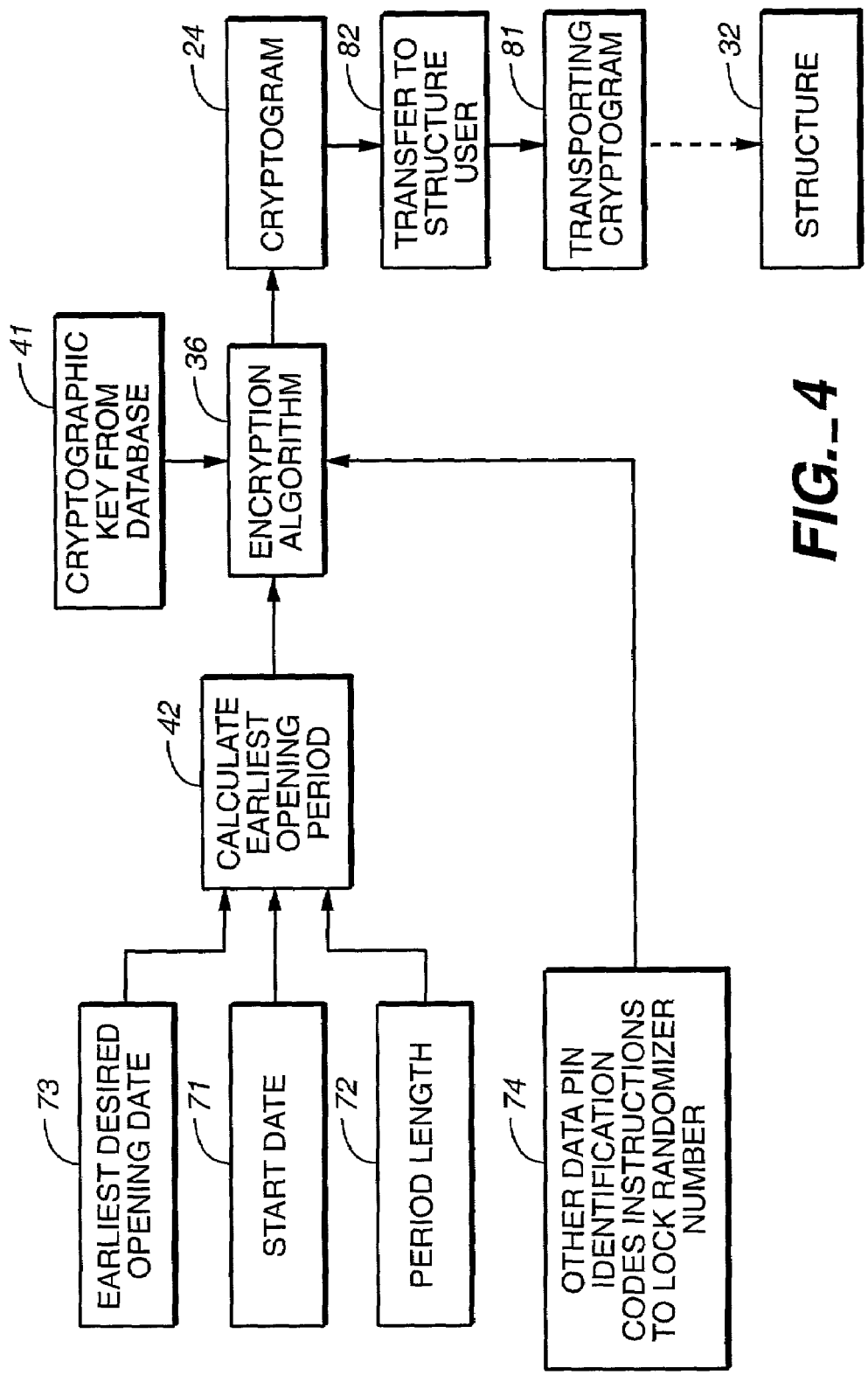

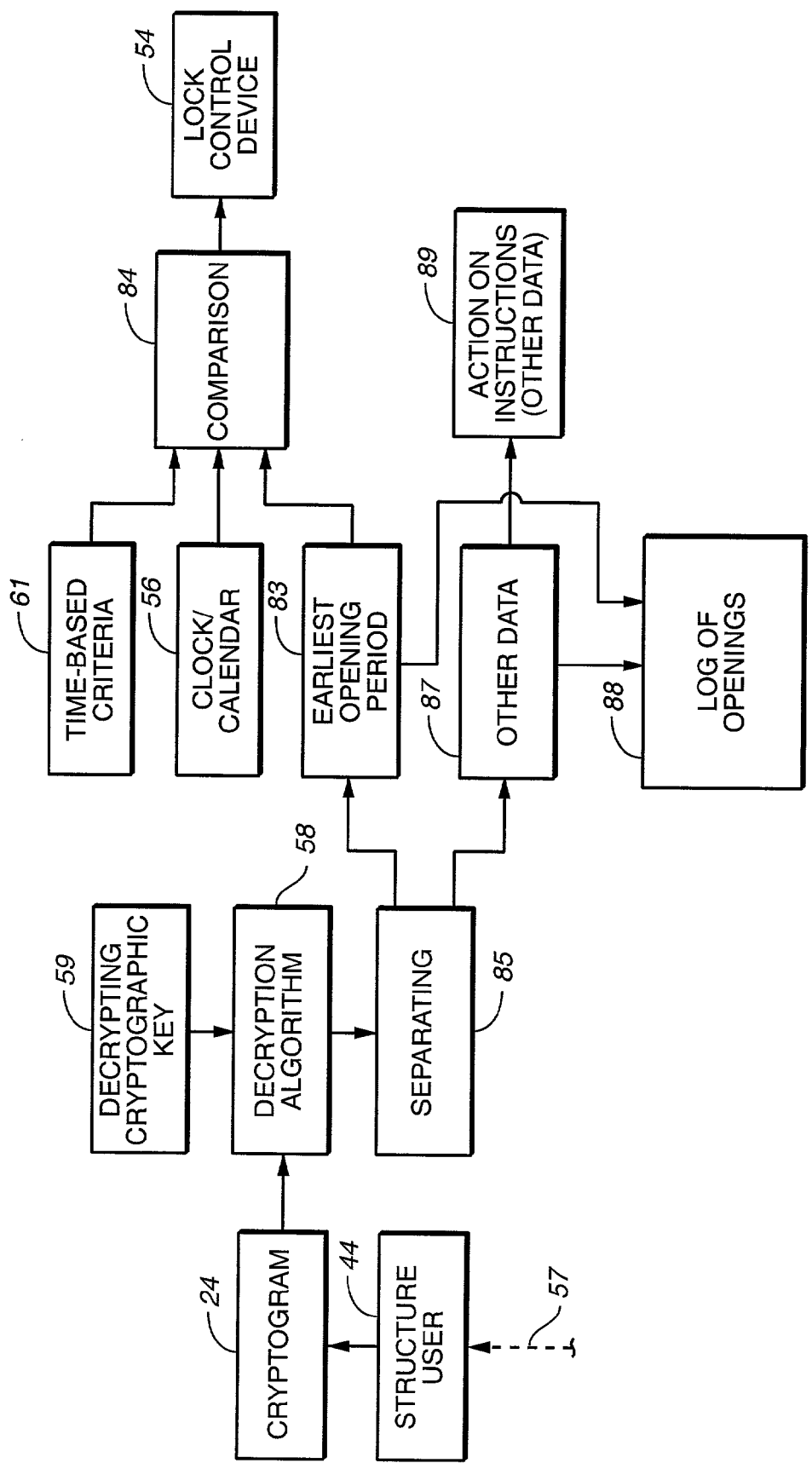
FIG._5

LOCKED PORTAL UNLOCKING CONTROL APPARATUS AND METHOD

TECHNICAL FIELD

The present invention relates, in general, to locked portal opening control systems which provide time-limited access to the interior of structures through a locked portal, and more particularly, relates to an apparatus and method for controlling the unlocking of remote, locked structures when verification of the authority of a person seeking to unlock the portal cannot be determined using on-line or instantaneous communications.

BACKGROUND ART

While there are numerous applications in which verification of permission to unlock the opening to a structure can be readily accomplished using on-line or instantaneous communications between the structure and a central control authority, there remain still other applications in which verifying the authority to unlock locked structures can be very difficult. One such application, which is becoming more common, is the e-commerce "last mile" problem of delivering products, which have been ordered, often on-line, to residences in which the occupants are not at home. The delivery or courier service may not leave packages at the occupant's residence or office if occupant is not present and the delivery service is unable to secure the delivered item at the office or residence. Conversely, residents may not want to leave returned packages or items in an unsecure condition on, for example, their front porch or outside an office door. This delivery-return security problem can be solved by the use of lock boxes if the occupant and the delivery or pick up service are able to reliably gain access to the lock box and unauthorized third parties are locked out. Lock boxes can theoretically be coupled into an on-line verification system, but normally this is not done because it would involve undesirable cost.

Similarly, many apartments, condominiums, hotels and even residences have situations in which maintenance or service personnel need to enter the room or residence to perform various services or to deliver or pick up items. Again, if the resident or occupant of the room is not present, an entrance permission verification problem occurs in which the occupant or resident wishes to allow certain personnel access and yet wishes to exclude all others. Verifying the permission of a person to unlock and enter when such rooms or structures are not connected on-line to a verifying authority can be difficult.

A straightforward approach to these remote access problems is to provide combination locks that can be used by both the owner of the structure and the various personnel who need to deliver or pick up items, or perform services. The problem with this approach is that as the number of delivery people increases, more and more people know the combination and restricting entry to only those who are currently authorized to enter is essentially impossible.

Combination locks also have been coupled with clocks so that the lock cannot be opened even with the correct combination, if it is not during a certain time period. This time-coupling of lock operation provides additional security, but again requires dissemination of the combination to an undesirable number of people, with a resultant compromise of security.

Still another approach has been to use "smart card" based systems. A stored electronic key on the card, which can be varied by the key issuing authority, is used with a personal identification number (PIN). The card holder inserts the smart card at a card reader and then also inputs the PIN number to verify his or her identity. If the key and PIN number match stored data at the reader, access to the locked structure is permitted. U.S. Pat. Nos. 5,936,221 and 5,204,663 are typical of smart card based security systems.

On-line or instant communication systems using smart cards also have been employed, as have various encryption based on-line systems. Typical of systems which are suitable for complex multi-user security applications are the systems shown in U.S. Pat. Nos. 5,657,388; 5,485,519; 5,479,512; 5,361,062; 5,237,614; 5,168,520; and 4,720,860. The suitability of such security systems for use in an e-commerce lock box delivery system is also more theoretical than practical.

Accordingly, it is an object of the present invention to provide a locked portal opening control system which can be used in off-line applications to verify the permission of personnel to unlock the portal of structures at remote locations.

Another object of the present invention is to provide a security or locked portal opening control system which can be used by many people and yet is time-limited so that even persons who have been given permission to enter lose their ability to enter outside desired time intervals.

Another object of the present invention is to provide a method and apparatus for controlling the opening of portals in secure structures, such as lock boxes, rooms or vehicles, which allow record keeping as to those entering the structure, and afford the central authorizing authority the ability to lock out all users.

Still a further object of the present invention is to provide a security or access control system which is suitable for use by numerous users and provides controlled access to secure structures without the use of smart cards or personal identification numbers (PINs) and without having the security compromised over time as the number of users increases.

The locked portal unlocking or opening control system of the present invention has other objects and features of advantage that will become apparent from, or are set forth in more detail in, the accompanying drawing and the following description of the Best Mode of Carrying out the Invention.

DISCLOSURE OF THE INVENTION

The locked portal opening control system of the present invention comprises, briefly, an encryption device responsive to input of a structure identifier that encrypts a time representation, using an encrypting cryptographic key associated with the structure identifier, to produce a cryptogram; a structure remote of the encryption device having a lock mechanism controlling access to the structure; and a decryption device located at the structure and having an unlocking assembly coupled to the lock mechanism. The decryption device further is responsive to input of the lock cryptogram to unlock the lock mechanism if a decrypted time representation produced by decrypting the lock cryptogram meets a time based criteria in the decryption device.

The method of accessing the interior of a locked structure of the present invention comprises, briefly, the steps of creating a lock cryptogram at an encryption device located remote of a locked structure by encrypting a time representation using an encrypting cryptographic key associated with the locked structure; transporting the lock cryptogram, usually by physically carrying the lock cryptogram, from the encryption device to the locked structure; inputting lock cryptogram into the decryption device at the locked structure; decrypting the lock cryptogram using a decryption algorithm and the decrypting cryptographic key at the decryption device to produce a decrypted time representation; comparing the decrypted time representation with a time representation at the decryption device; and unlocking the lock at the structure if the decrypted time representation meets a time-base criteria relative to the time representation at the encryption device.

The present locked portal control system may be applied to such applications as controlling access to the interior of a plurality of lock boxes positioned at various remote locations for use by package delivery and/or pick up personnel who are issued cryptograms at a central control authority and who gain entry to the lock boxes using cryptograms which they carry to the lock boxes. Similarly, for applications at hotels, condominiums, apartment houses and residences or second homes, a central management authority can issue cryptograms that are carried to the locked rooms and are decrypted at each room to allow entry to authorized personnel during certain time periods.

DESCRIPTION OF THE DRAWINGS

FIG. 1 is a block diagram of a locked portal opening control system constructed in accordance with the present invention.

FIG. 2 is a block diagram of an encryption apparatus provided at a central cryptogram issuing authority in the security access system of FIG. 1.

FIG. 3 is a block diagram of a decryption apparatus provided at each remote locked structure using the security access system of FIG. 1.

FIG. 4 is a block diagram of the steps of the method of the present invention which are performed at the encryption apparatus of FIG. 2.

FIG. 5 is a block diagram of the steps of the method of the present invention which are performed at the remote secure structure of FIG. 3 to unlock the same.

BEST MODE OF CARRYING OUT THE INVENTION

The preferred embodiments of the present invention, examples of which are illustrated in the accompanying drawings, will now be set forth. While the invention will be described in conjunction with the preferred embodiments, it will be understood that the described embodiments are not intended to specifically limit the invention. On the contrary, the invention is intended to cover alternatives, modifications and equivalents, which may be included within the spirit and the scope of the invention, as defined by the appended claims.

Overall System

Referring now to FIG. 1, an overview of the access control system of the present invention can be seen. The present system, generally designated 21, includes an encryption device 22 which is responsive to input of a structure identifier to encrypt a time representation for a selected structure 23, 23a, 23b, . . . 23n, using an encrypting cryptographic key associated with the structure identifier to produce a cryptogram output 24. Structures 23, 23a, 23b, . . . 23n will be remote of encryption device 22 and will each include a lock mechanism 26, 26a, 26b, . . . 26n controlling access to the interior of the structure. A decryption device 27, 27a, 27b, . . . 27n is also located at each remote structure 23, 23a, 23b, . . . 23n. Each decryption device is responsive to input of cryptogram 24 for the structure corresponding to the identifier input at the encryption device 22 to unlock the lock mechanism at that structure if the decrypted time representation produced by decrypting cryptogram 24 meets a time-based criteria present in the decryption device.

As used herein, the expression "structure" shall be understood to include a wide variety of enclosures, containers, vaults, boxes, safes, buildings, rooms, offices, vehicles and gated or locked spaces (essentially any structure having a portal closure device capable of being locked).

Usually, locked portal opening system 21 will employ a single encryption device 22 which controls access to a large number of structures 23, 23a, 23b . . . 23n. As will be apparent from the description below, however, the present system also can employ a plurality of cryptogram issuing encryption authorities 25 or encryption devices 22, each of which can issue cryptograms 24 suitable for use at selected ones of the same set of structures 23, 23a, 23b, . . . 23n. Cryptograms 24 issued by multiple encryption devices 22 will differ depending upon the encrypting cryptographic key and the time representation encrypted with the cryptographic key.

It will also be understood that system 21 can be used to control access to only a relatively few and fixed number of structures 23, 23a and 23b. Thus, encryption operator or authority 25 could be located at the central lobby of a hotel or motel while structures 23, 23a and 23b could be a limited set of motel or hotel rooms. In large systems, the encryption authority 25 could be a central e-commerce encrypting authority with structures 23, 23a, 23b, . . . 23n being a growing population of thousands, and even hundreds of thousands, of lock boxes located at customer's residences, offices, etc.

Cryptogram Issuing Assembly

Referring now to FIG. 2, details of one or more central cryptogram issuing assemblies can be set forth. Central encryption device 22 will include an input device 31, such as a keypad, computer with a mouse-driven graphic display, or other similar input mechanism of the type well known in the art. Input device 31 is coupled to a central processing unit (CPU) 32, which in turn, communicates with and receives data from storage device 33. An output device, such as a printer or computer display screen 34 is also coupled to CPU 32 so that the resulting cryptogram 24 can be output from encryption device 22.

Stored in storage device 33 will be an encryption algorithm 36 and at least one, and generally a plurality or multiplicity of, encrypting cryptographic keys 37. Keys 37 can be provided in storage device 33 in a look-up table 38 in which the structure identifier 39 is correlated with a corresponding encrypting cryptographic key 37. As will be appreciated for small systems, storage device 33 can simply reside in the CPU memory.

Finally, a clock or calendar device 42 is also coupled for input into CPU so that time representations can be encrypted with encrypting cryptographic keys 37 by CPU using algorithm 36 to produce cryptogram 24.

Various types of encryption algorithms 36 are suitable for use with the locked portal opening control system of the present invention. It is desirable, however, that the resulting cryptogram 24 be relatively short so that its subsequent input at the decryption device at the structure is not burdensome. For example, a cryptogram comprised of six digits is highly desirable. Algorithms suitable for production of such six digit cryptograms are well known in the encryption art, and it is preferred that a block type encryption algorithm be employed.

Alternatively, a non-symmetric encryption algorithm such as a public key/private key system can be used.

A symmetrical block encryption algorithm could take the following form:

Select a set of S-boxes, an arbitrary mapping arrangement of any possible 8-bit number into some usually different 8-bit number. The selection of the set of S-boxes is part of the system set up.

Select a number of rounds, generally between ten and sixteen, inclusive. Let M=the number of rounds +1.

Each remote location lock has a key that is a series of hexadecimal digits (0–9, A–F). The count of hexadecimal digits in the key is equal to the number of rounds. The key is distributed in an array:

key(1)=first hex digit
key(2)=second hex digit
key(rounds)=last hex digit

Step A: Transpose the 19 bits to be encoded in an arbitrary manner. The transposition arrangement is part of the system setup.

Step B: Select the 16 low order bits, saving the 3 high order bits.

Step C: Divide the 16 bits into two 8 bit halves, Left(1) and Right(1).

Step D: For a number of times equal to the number of rounds perform the following operations where N is number of times, i.e., for N=1, 2, 3, . . . (Number of Rounds), do Right(N+1)=Left(N)
Left (N+1)=Right(N) XOR (S-BOX((Left(N)+Key(N)) AND 255))

Step E: Reassemble the 19 bit quantity by placing the saved high order bits as the three highest order (leftmost) bits, followed by the last Left 8 bits (Left (M)), followed by the last Right 8 bits (Right(M))(as the right-most bits).

Step F: Select the high order (leftmost) 16 bits, saving the lowest order (rightmost) 3 bits.

Step G: Repeat Steps C and D.

Step H: Reassemble the 19 bit quantity by placing the last Left 8-bit quantity (Left (M))as the highest order bits, followed by the last Right 8-bit quantity (light (M)), and then the saved 3 low order bits.

Step I: Interpret the 19 bit quantity as a number between 0 and 524287. This is the cryptogram output of the encryption device.

To decrypt, reverse the process.

Preferably, encrypting cryptographic keys 37 are unique to each of structures 23–23n, but it would be permissible for two structures, 23a, 23b, to have the same key. The encryption keys typically will be 40 to 64 bit keys associated with, for example, an identifier such as a room number or a box number or a structure number.

Encryption device 22 further includes an encryption or first clock 42 which is capable of producing a time representation.

In the broadest aspect of the present invention, the time representation can be time alone, or a date alone or a combination of the two. The time and/or date do not have to be current or the actual local time and date, but as will be seen hereinafter, the relationship between the encryption clock and the decryption clock must be known.

In the preferred embodiment, the time representation produced by encryption or first clock 42 and the decryption or second clock 56 (FIG. 3) are expressed as a duration since a specified upon starting time. Thus, if the current date is Sep. 28, 2000, the time duration since an initial start time of Jan. 1, 1990 is ten years, nine months, and 27 days, or (assuming February always has 28 days), (10 years*365 days/year)+273 days to the end of August, +28 days, =3951, i.e., we are in the 3951 day since the initial start time. If the period is twenty-three days, 171 full periods have elapsed, and we are in the 172nd period.

Days can be added or subtracted by the encrypting CPU as necessary to account for the differences (if any) in the time settings between the encrypting and remote clocks. Days can also be added as specified by the requesting authority to allow the unlock permissions that will start at some future date.

Obviously, the duration and periods can be extended to hours, minutes and seconds.

Using this scheme, encryption or first clock 42 can produce time representations between 0 and 4095 which can be made to cover 100 years from an arbitrary start point by making the period equal to 9 days. The numbers between zero and 4095 can be expressed as a 19 bit input to algorithm 36, and the algorithm will produce a six decimal digit cryptogram 24 as output. With 19 bits of data, 12 bits are available for period data and 7 bits for other data. Increasing the bit string to twenty bits would start to produce seven digit outputs for cryptogram 24, which would not be fatal, but which become somewhat more cumbersome.

In operation, therefore, encryption device 22 receives an input from the encrypting authority or user 25 via input device 31. The input preferably is merely an identifier for the structure for which permission to unlock the portal is to be given. Thus, the input by the cryptogram issuing authority might be room 205 or lock box 3,086. CPU 32 then goes to look-up table 38, and for structure 205 or 3,086, the CPU looks up and retrieves a stored unique encrypting cryptographic key 37. CPU 32 also fetches the encryption algorithm, as well as a time representation from encryption or first clock 42. The CPU then inputs the time representation from clock 42 and cryptograph key 37 from storage device 33 into encryption algorithm 36 to produce cryptogram 24 at output device 34.

At this point, the encrypting authority 25 will give cryptogram 24 to the person 44 seeking access to the remote structure. Obviously, the cryptogram could also be given to an intermediary who then gives the cryptogram to the eventual person or user 44 who will seek access to the structure.

Decryption Assembly

In FIG. 3 it will be seen that decryption device 27 at structure 23 will include an input device 51, central processing unit (CPU) 52, storage device 53, a lock control output device 54, and a decryption or second clock 56. In the system of the present invention, each structure 23, 23a, 23b, . . . 23n will have a decryption assembly with similar elements or components.

Again, the most preferred input device 51 will be a keypad so that user 44 having cryptogram 24, for example, a six digit number, can easily input the cryptogram to input device 51. User 44 will have transported the cryptogram from the central cryptogram issuing authority to a selected one of remote structure 23, 23a, 23b, . . . 23n as indicated by broken line 57. Once cryptogram 24 is input at device 51 to CPU 52, CPU 52 fetches a decryption algorithm 58 from storage device 53 and a decrypting cryptographic key 59. Decrypting cryptographic key 59 is known for the selected structure as selected from look-up table 38 at the encryption device. In decryption device 27, however, only the decrypting cryptographic key for the specific structure at which the decryption device is located will be stored in memory 53. Accordingly, decrypting cryptographic key 59 could be easily incorporated into stored decryption algorithm 58, but storing key 59 as a separate element in memory eases the change of cryptographic keys if necessary or desirable.

Decryption algorithm 58 is complimentary to encryption algorithm 36 and is formed to decrypt cryptogram 24 using key 59 so as to produce a resulting time representation. Central processing unit 52, therefore, inputs the decryption algorithm with cryptogram 24 and with decrypting cryptographic key 59 to produce a time representation output. The CPU fetches a time representation from decryption or second clock 56, which representation, as above indicated, is fixed and known relative to the time representation being produced by first or encryption clock 42. CPU 52 then compares the time representation output with the time representation based on the second or decryption clock 56. If the time representation produced by decrypting the cryptogram compares with the time representation from decryption clock 56 in accordance with a predetermined time-based criteria as stored at 61 in memory 53, CPU 52 outputs a signal to lock control device 54 to allow or unlock lock 26.

If cryptogram 24, when decrypted, produces a time representation which does not meet the criteria as compared to the time representation from the decryption clock 56, the CPU will not cause the lock control device to allow unlocking of lock 26. Thus, a user who inputs a random six digit number in an attempt to open lock 26 will have an extremely low statistical chance of guessing the correct cryptogram 24 which will produce a time representation meeting the lock opening criteria. Moreover, because cryptogram 24 is time coupled, cryptogram 24 which would have opened lock 26 at one time, will fail to do so at a later or earlier time since the time-based criteria 61 stored in storage device 53 will not be met.

Time-based criteria 61 can be a range of the number of periods used in the encryption and decryption clocks. For example, if the number of periods from the arbitrary start time to the current time is 32 when cryptogram 24 was created, and if the decryption clock is running at the same time as the encryption clock, time-based criteria 61 might be 32 plus 2 time periods. This would allow unlocking of the lock 26 if the number of periods resulting from decrypting of the cryptogram were 32, 33 or 34. If the periods were three days, this would allow opening the structure in a nine day window. Obviously, the period can be shortened to allow opening of the structure only during a much smaller window, even in a window expressed in minutes. Since in some applications it is difficult to determine when structure user 44 will reach the remote structure, it is desirable for the criteria 61 to include some flexibility. Obviously, the amount of flexibility in the time criteria 61 will depend upon the application and the typical transport times to the remote structure and will be set by the cryptogram issuing authority.

It is also possible to run the decryption or second clock at an offset relative to the encryption or first clock and to further adjust the time-based criteria 61 so as to result in the desired window for opening lock 26.

In the most preferred form of decryption device 27, storage device 53 further includes a capability of creating and storing a record of use of the decryption device in a record storage portion 62 of memory 53. This will allow later input of commands via keypad 51 by an auditing authority to cause central processing unit 52 to retrieve stored records as to cryptograms used and attempted openings of lock 26. These data can be output at an output device 63.

As is conventionally done with many locks, the CPU can also shut out any user who starts inputting cryptograms at random in hopes of opening lock 26. For example, the criteria can be that the input of more than five unsuccessful cryptograms will cause the lock to ignore further inputs for, for example, ten minutes and thereafter only accept entries every five minutes.

A lock which is particularly well suited for use with decryption device 27 are the electronic locks set forth in U.S. Pat. Nos. 4,802,353 and 4,854,143. These locks are battery powered, which also preferably is the case for decryption device or assembly 27. They also are relatively compact and employ a lock opening control system in which the manual power for lock opening is provided by the user, but the ability to engage and open the lock is controlled electronically. Such locks are available commercially through BridgePoint Systems, Inc. of Alameda, Calif. under the trademark INTELOCK.

System Method

Having described the apparatus of the present invention, the method of unlocking a locked structure can be set forth in more detail. In FIG. 4, the first step of creating a cryptogram 24 is schematically illustrated. Cryptogram 24 is created by encrypting a time representation from first or encryption clock device 42 with an encrypting cryptographic key 41 which is selected based upon the identity of the structure to be unlocked. As above described, the time representation can be based upon a start date 71 and a period length 72 stored in clock 42, or CPU 32, as well as an earliest desired opening date 73, which will depend upon practical application of control system 21.

The earliest desired opening date might be the current date and a time as known by the decryption device, or it might be the current date and time as known by the decryption device plus a selected amount, expressed in periods, from the current time/date. The earliest desired opening date will depend on the system. In an e-commerce delivery system, for example, earliest possible opening date 73 may be the maximum number of periods from the current date/time for a delivery person to reach a remote lock box, for example, at least four hours from the issuance of the cryptogram. In a hotel or motel opening application, the earliest possible opening date for the room might be five minutes from issuance of the cryptogram. This anticipated opening time will affect the selection of the period length 72 and is part of the set up of both the first and second clocks which produces the time representation input to algorithm 36 and decrypt it for comparison at the structure.

As will be seen from FIG. 4, it also is possible to input "other data" into algorithm 36. This other data acts to further randomize resulting cryptogram 24, making it less susceptible to decryption. Thus, codes for the entity making the e-commerce delivery can be input, as shown by box 74 in FIG. 4, as can instructions to the box, such as, keep the lock unlocked after it is open, and random numbers also can be added, simply to enhance security. Obviously, such randomizer or other data input 74 must also be interpreted at the decryption device, as will be set forth below.

One further example of "other data" would be a PIN. Thus, a person trying to enter a box or residence would have to enter cryptogram 24, followed by his or her PIN. This allows the cryptogram to be issued more freely, even where it might be overheard, and still have it be secure. Thus, the issuing authority could say, "Joe, go into Mrs. Jones apartment on Wednesday and fix the faucet. The entrance code [cryptogram] is 3456." Even if the cryptogram 3456 is overheard, or Joe writes it down and loses it, no one else can get into the apartment because Joe also has to enter his PIN, which is not part of the message.

This use of PINs as "other data" could be implemented by a database for the encryption decryption devices. Thus, the issuing authority could a database, associating people's identities with their PIN.

Once the step of creating a cryptogram has been performed, the next step in the present method is shown at box 81 in FIG. 4, namely, transporting the cryptogram from the encryption device 22 to structure 32. That transporting step occurs after the intermediate step of delivery of cryptogram 24 to the structure user, such as to a delivery agent or repairman.

The next step in the present method is shown in FIG. 5. Cryptogram 24 is input to the decryption device located at the selected one of structures 32, 32*a*, 32*b*, . . . 32*n* to be accessed. As above described, the decryption device has a decryption algorithm 58, a decrypting cryptographic key 59, a decryption or second clock operating in a fixed known relationship to first clock 42, and a time-based criteria 61 for allowing opening of the lock. Thus, the next step in the present method is inputting cryptogram 24 into decryption device 27 and decrypting the lock cryptogram using decryption algorithm 58 and decrypting cryptographic key 59 to produce a decrypted time representation 83. If the comparison meets criteria 61, the next step of the present method is unlocking step 84 in which the lock at structure 32 is opened or allowed to be opened.

If input of "other data" or randomizer data was done at 74 in FIG. 4, then the present method also preferably includes a separating step 85 in which earliest opening period 83 is separated from the "other data" 87. For example, the decrypted 19 bits can be separated into groups. If the decrypted 19 bits are 1011001110001111000, and if the period number is 13 bits long (and is contained in the first part of the data), then the period number is 1011001110001 and the "other data" is 111000.

"Other data" 000000 through, 000111, for example, could be assigned to Federal Express, while 001000 through 001010 could be assigned to the U.S. Post Office, and the codes 111110 and 111111 could mean "stop operation" and "start operation."

The present method can further include storing information at 88, such as the decrypted time representation 83 and the "other data" 87. If other action is to be taken, then "other data" also will be output to action step 89 (e.g., stop operation) so that action is taken on instructions input as "other data" input 74 (FIG. 4). Thus, the lock could be disabled in either the locked or an unlocked (preferred) condition.

While the present method can be used for a single structure 32, it is most advantageously used in connection with the plurality of structures 32, 32*a*, 32, . . . 32*n*, as above indicated. Thus, the method of the present invention also preferably includes the steps of providing a plurality of lock structures, each having a decryption device associated therewith and each including a decryption algorithm corresponding to the encryption algorithm used at the cryptogram issuing authority. The decryption devices at each structure also include a decrypting cryptographic key identifying the particular lock structure at which the decryption device is located, and all decryption devices include a decrypting or second clock operating at a fixed relationship to the encrypting or first clock. In such a multi-structure systems, a plurality of encrypting cryptographic keys are stored in the encryption device and correlated to a plurality of structure identifiers. The step of creating the cryptogram is accomplished by inputting a selected one of the plurality of structure identifiers into the encryption device, which then retrieves the stored encrypting cryptographic key for the identifier input.

Transportation of cryptogram 24, usually is effected by physically carrying the same. Thus, an agent 44 carries cryptogram 24 on a piece of paper, in his or her hand, or in another device to the specific structure for which the decrypting cryptographic key stored in the decryption device corresponds to the encrypting cryptographic key selected by identifier input at the encryption device. It would also be possible to transport the cryptogram on magnetic media or even a smart card for convenience of transportation.

In the present method, the step of providing a plurality of lock structures can be accomplished by providing the lock structures as locked containers, or as locked rooms, or as locked vehicles, or as locked enclosures. Similarly, as above described, the step of encrypting a time representation with an encrypting cryptographic key can be accomplished by using the time at the first or encrypting clock when inputting of the structure identifier occurs, or creating a time representation based upon a time representation which varies from the time of identifier input by a known amount. The variance can take into account the fact that the first or encryption clock can be operating, for example, at a clock time earlier or later than the second or decryption clock, or that it is desired that entry not be permitted until some specified time in the future.

In an application for hotels, condominiums, apartment houses, residences and the like, the central management authority can issue cryptograms that are carried by delivery or repair personnel to the locked rooms. At the locked room, the decryption device decrypts the cryptogram in order to allow entry of the authorized personnel to the room during certain time periods which meet stored criteria. Cryptograms for the same lock issued at different times will be different by reason of the time-based coupling of the cryptogram, even though the encryption key is the same for the specific locked room.

In an e-commerce environment, the delivery agent can be given a cryptogram for a lock box on a porch of a resident which will enable the agent to transport e-commerce goods to the lock box and open the box within a time-based criteria for opening. The box can then be closed and relocked and then the resident or occupant can unlock the lock box, using, for example, a personal identification number (PIN) for the lock box that only the resident knows. The delivery agent does not need to receive the resident's lock box PIN code and can be required to input their own PIN, as set forth above. Thus, the lock box issuing authority can prevent the homeowner from continuing to use a box, for example, if the homeowner refuses to pay the on-going rental, by simply changing the PIN code or by instructing the lock to stay open.

The locked portal opening control system of the present invention, therefore, provides a highly effective system which can be used off-line without the need to disseminate PIN numbers to third parties. The cryptograms created at the heart of the present system are time-coupled to make them ineffective over time. The window of authorized use can be short or long, depending upon the system application. Multiple access can be granted over time shifted periods, and the owner of the lock structure can be given access at any time. All of this may be accomplished off-line.

The foregoing description of specific embodiments of the present invention has been presented for the purpose of illustration. It is not intended to be exhaustive or to limit the invention to precise forms disclosed, and obviously many modifications and variations are possible in light of the above teaching. The embodiments were chosen and described in order to best explain the principles of the invention and its practical application in order to thereby enable others skilled in the art to best utilize the invention and various embodiments with various modifications as are suited to the particular use contemplated. It is intended that the scope of the invention be defined by the claims appended hereto, when read and interpreted according to accepted legal principles such as the doctrine of equivalents and reversal of parts.

What is claimed is:

1. A method of unlocking a locked structure comprising the steps of:
   (a) creating a cryptogram at an encryption device located remote of said locked structure, said encryption device having a first clock, by encrypting a time representation based upon said first clock with an encrypting cryptographic key for said locked structure using an encryption algorithm;
   (b) transporting said cryptogram from said encryption device to said locked structure;
   (c) inputting said cryptogram into a decryption device at said locked structure, said decryption device having:
      (i) a decryption algorithm corresponding to said encryption algorithm,
      (ii) a decrypting cryptographic key corresponding to said encrypting cryptographic key at said encryption device, and
      (iii) a second clock at the encryption device operating at a fixed time relationship to said first clock;
   (d) decrypting said cryptogram using said decryption algorithm and said decrypting cryptographic key at said decryption device to produce a decrypted time representation;
   (e) comparing said decrypted time representation with a time representation based upon said second clock; and
   (f) unlocking said lock at said structure if said decrypted time representation meets a time-based criteria relative to said time representation based upon said second clock.

2. The method as defined in claim 1, and the steps of:
   providing a plurality of locked structures each having a decryption device associated therewith, said decryption device including a decryption algorithm corresponding to said encryption algorithm, a decrypting cryptographic key identifying said locked structure, and a second clock operating at a fixed relationship to said first clock; and
   providing an encryption device having a plurality of encrypting cryptographic keys stored therein and correlated to a plurality of structure identifiers for said plurality of locked structures; and,
   said step of creating said cryptogram is accomplished by inputting a selected one of the plurality of structure identifiers into said encryption device to select an encrypting cryptographic key for use with said encryption algorithm; and said transporting step is accomplished by transporting said cryptogram to a structure having a decrypting cryptographic key matching the selected encrypting cryptographic key.

3. The method as defined in claim 2, and the step of:
   inputting other data to said encryption device prior to said encrypting step; and during said encrypting step, creating a cryptogram including said other data; and
   during said decrypting step, separating said other data from said decrypted time representation.

4. The method as defined in claim 3 wherein,
   the step of inputting other data is accomplished by inputting a PIN for the person performing the transporting step.

5. The method as defined in claim 3 wherein,
   said step of providing a plurality of locked structures is accomplished by providing said locked structures as package-receiving locked boxes, and the step of:
   positioning said boxes at a plurality of spaced apart locations.

6. The method as defined in claim 5 wherein,
   said positioning step is accomplished by positioning said package-receiving locked boxes at a plurality of residences.

7. The method as defined in claim 3 wherein,
   said step of providing a plurality of structures is accomplished by providing a plurality of locked residences; and
   said step of inputting other data is accomplished by inputting identifying data as to a person authorized to enter a selected one of said residences.

8. The method as defined in claim 7 and the step of:
   at said decryption device recording the time of input of said cryptogram and said identifying data as to the authorized person.

9. The method as defined in claim 2 wherein,
   said step of providing a plurality of locked structures is accomplished by providing said locked structures as a plurality of locked containers.

10. The method as defined in claim 2 wherein,
    said step of providing a plurality of locked structures is accomplished by providing said locked structures as a plurality of locked rooms.

11. The method as defined in claim 2 wherein,
    said step of encrypting a time representation with the selected encrypting cryptographic key is accomplished by using a time from said first clock at which said inputting of said structure identifier occurs.

12. The method as defined in claim 11 wherein,
    the step of encrypting is accomplished by using a time offset relative to the time from said first clock to account for a difference in time between said first clock and said second clock.

13. The method as defined in claim 11 wherein,
    the step of encrypting is accomplished by using a time offset relative to the time from the first clock to delay unlocking of said lock.

14. The method as defined in claim 11 wherein,
    said step of encrypting a time representation with the selected encrypting cryptographic key is accomplished by creating a time representation based upon time from said first clock and a period factor.

15. The method as defined in claim 14 wherein,
    said step of creating a time representation includes dividing a clock time from said first clock by said period factor.

16. The method as defined in claim 15 wherein, said period factor includes a date interval.

17. The method as defined in claim 2 wherein said plurality of structures each can be unlocked using a different cryptogram.

18. The method as defined in claim 1 wherein, said transporting step is accomplished by physically transporting said cryptogram from said encryption device to said decryption device.

19. The method as defined in claim 1 wherein, said first clock is operating at a clock time different from said second clock, and
said time-based criteria for unlocking said lock is that said step of inputting said cryptogram must be accomplished after the clock time of said second clock reaches the clock time encrypted into said cryptogram.

20. The method as defined in claim 1 wherein, said encrypting step is accomplished using a time representation based upon clock time from said first clock and a known opening time period.

21. The method as defined in claim 1 wherein, said encrypting step is accomplished by inputting said encrypting device with an opening time period for use with a clock time from said first clock to produce said time representation.

22. The method as defined in claim 21 wherein, the opening time period input establishes an earliest time at which said lock can be unlocked.

23. The method as defined in claim 1 wherein, said step of creating a cryptogram is accomplished by using symmetrical block encryption and decryption algorithms.

24. The method as defined in claim 23 wherein, said step of creating a cryptogram is accomplished by using an encryption algorithm producing a cryptogram of six digits or less.

25. The method as defined in claim 1 wherein, said step of creating a lock cryptogram is accomplished by using unsymmetrical encryption and decryption algorithms.

26. The method as defined in claim 25 wherein, the unsymmetrical algorithms are public key/private key algorithms.

27. The method as defined in claim 25 wherein, said step of creating a cryptogram is accomplished by using an encryption algorithm producing a cryptogram of six digits or less.

28. A locked portal opening control system comprising:
an encryption device responsive to input of a structure identifier to encrypt an encrypting cryptographic key for a structure with a time representation to produce a cryptogram output;
a structure remote of said encryption device having a lock mechanism controlling access to said structure; and
a decryption device located at said structure and having an unlocking assembly coupled to said lock mechanism, said decryption device being responsive to input of said cryptogram to unlock said lock mechanism if a decrypted time representation produced by decrypting said cryptogram meets a time-based criteria in said decryption device, wherein,
said encryption device includes a first clock and an encryption algorithm;
said decryption device includes a second clock operating a fixed time relationship to said first clock, and a decryption algorithm corresponding to said encryption algorithm; and said decryption device decrypts said cryptogram to produce a decrypted time representation and compares said decrypted time representation against a time representation based upon a clock time of said second clock to cause said unlocking assembly to unlock said lock mechanism if the decrypted time representation meets said time-based criteria.

29. The locked portal opening control system as defined in claim 28, and
a plurality of structures remote of said encryption device each having a lock mechanism controlling access thereto; and
said encryption device being response to input of said structure identifier to select one of said plurality of structures to produce a cryptogram suitable for unlocking the lock mechanism for the selected one of said plurality of structures.

30. The locked opening control system as defined in claim 29 wherein, said plurality of structures are provided by a plurality of locked containers spaced apart from each other.

31. The locked portal opening control system as defined in claim 29 wherein,
said plurality of structures are provided by a plurality of locked rooms.

32. The locked portal opening control system as defined in claim 28 wherein,
said encryption device includes an encryption processor and an input device, a first clock, a storage device and an output device, all coupled to said encryption processor;
said storage device of said encryption device has an encryption algorithm and a plurality of encrypting cryptographic keys stored therein; and
said encryption processor is responsive to a structure identifier input through said input device to:
(i) select one of said plurality of encrypting cryptographic keys from said storage device,
(ii) obtain a clock time from said first clock and produce a time representation from said clock time,
(iii) encrypt said time representation with the selected encrypting cryptographic key using the stored encryption algorithm to produce said cryptogram,
(iv) and output said cryptogram at said output device.

33. The locked portal opening control system as defined in claim 32 wherein,
said decryption device includes a decryption processor, and an input device and a second clock coupled to said decryption processor;
said second clock operating at a fixed time relationship to said first clock, and said unlocking mechanism being coupled to said decryption processor;
said decryption device further includes a decrypting cryptographic key corresponding to said encrypting cryptographic key selected by said encryption device, and a decryption algorithm corresponding to said encryption algorithm; and
said decryption processor being responsive to input of said cryptogram through the input device of said decryption device to:
(i) decrypt said cryptogram using said decryption algorithm and the decrypting cryptographic key to produce a decrypted time representation,
(ii) obtain a clock time from said second clock and produce a time representation based thereon,
(iii) compare said decrypted time representation with the time representation obtained from said second clock, and (iv) actuate said unlocking assembly to unlock said lock mechanism if said decrypted time representation meets known time-based criteria relative to said time representation obtained from said second clock.

34. The locked portal opening control system as defined in claim 28 wherein,
said encrypting encryption device is formed to modify said encryption key selected by said structure identifier using additional data input to said encryption device; and
each of said decryption devices is formed to separate said additional data from said time representation during decryption of said cryptogram.

35. The locked portal opening control system as defined in claim 34 wherein,
each of said decryption devices is coupled to a recording device for recording of clock time of said second clock upon input of said cryptogram into said decryption device and for recording said additional data.

36. The locked portal opening control system as defined in claim 28 wherein,
said encryption algorithm and said decryption algorithm are block type algorithms.

37. The locked portal opening control system as defined in claim 28 wherein,
said encryption algorithm and said decryption algorithm are non-symmetrical public key/private key algorithms.

38. This locked opening control system as defined in claim 37 wherein,
said encryption algorithm and decryption algorithm produce a cryptogram of six digits or less.

39. A lock box unlocking control system comprising:
a plurality of lock boxes positioned in spaced apart locations, each lock box having a lock mechanism, an unlocking device operatively connected to unlock said lock mechanism, and a decryption device operatively connected to said unlocking mechanism to activate said unlocking device and to cause unlocking of said lock mechanism upon entry of a cryptogram meeting time-based criteria into said decrypting device;
at least one encryption device formed to produce a cryptogram in response to input of a lock box identifier to said encryption device;
said encryption device and said decryption device having matching encryption and decryption algorithms and having clocks operating in a fixed time relationship to each other;
said encryption device having a plurality of different encrypting cryptographic keys stored therein and correlated to a plurality of lock box identifiers;
said decryption device at each of said plurality of lock boxes having a different decrypting cryptographic key;
said encryption device being formed to encrypt a time representation based upon a clock time of the encryption clock with an encrypting cryptographic key selected by input to said encryption device of a selected lock box identifier to produce a cryptogram; and
said decryption device being formed to decrypt said cryptogram using said decryption algorithm and a decrypting cryptograph key for the lock box into which said cryptogram is input to produce a decrypted time representation;
said decryption device further being formed to compare said decrypted time representation with a time representation based upon the clock time from the clock in said decryption device at the time of input of said cryptogram to said decryption device and to actuate said unlocking mechanism if said decrypted time representation and said time representation have upon the decryption clock meet a required criteria.

* * * * *